US005538464A

United States Patent [19]

MacKay, Jr.

[11] Patent Number: 5,538,464
[45] Date of Patent: Jul. 23, 1996

[54] DISPOSABLE ABRASIVE WHEEL HAVING DISPOSABLE MOUNTING HUB INCLUDING IMPROVED METAL PRESSURE CAP AND METHOD OF MANUFACTURING THE SAME

[76] Inventor: Joseph H. MacKay, Jr., 17551 Cabela Dr., San Diego, Calif. 92127

[21] Appl. No.: 290,200

[22] Filed: Aug. 15, 1994

[51] Int. Cl.$^6$ .................................................. B24B 41/00
[52] U.S. Cl. .......................................... 451/342; 451/510
[58] Field of Search ........................................ 451/342, 510, 451/548, 490, 508, 509, 521, 512, 360, 363

[56] References Cited

U.S. PATENT DOCUMENTS

| | | |
|---|---|---|
| 489,149 | 1/1893 | Hyde . |
| 566,883 | 9/1896 | Higgins . |
| 791,159 | 5/1905 | Norton . |
| 791,791 | 6/1905 | Hurford . |
| 872,932 | 12/1907 | Hall . |
| 1,162,970 | 12/1915 | Binford . |
| 1,724,742 | 8/1929 | Albertson et al. . |
| 1,998,919 | 4/1935 | Ball et al. . |
| 2,278,301 | 3/1942 | Bauer . |
| 2,567,782 | 9/1951 | Rhees . |
| 3,041,797 | 7/1962 | Moffly . |
| 3,081,584 | 3/1963 | Bullard . |
| 3,136,100 | 6/1964 | Robertson, Jr. . |
| 3,210,892 | 10/1965 | Perham . |
| 3,500,592 | 3/1970 | Harrist . |
| 3,566,547 | 3/1971 | Lonaberger et al. .......... 451/342 |
| 3,596,415 | 8/1971 | Donahue ...................... 451/510 |
| 3,621,621 | 11/1971 | Husack . |
| 3,800,483 | 4/1974 | Sherman . |
| 3,879,178 | 4/1975 | Bosma . |
| 3,912,411 | 10/1975 | Moffat . |
| 3,960,516 | 6/1976 | Biardi . |
| 4,015,371 | 4/1977 | Grayston . |
| 4,026,074 | 5/1977 | Malarz . |
| 4,054,425 | 10/1977 | Sherman . |
| 4,088,729 | 5/1978 | Sherman . |
| 4,240,230 | 12/1980 | Ferantini . |
| 4,322,920 | 4/1982 | Wells . |
| 4,439,953 | 4/1984 | Hasegawa . |
| 4,449,329 | 5/1984 | Horney . |
| 4,541,205 | 9/1985 | Patrello . |
| 4,601,661 | 7/1986 | May . |
| 4,637,170 | 1/1987 | Block ........................... 451/342 |
| 4,694,615 | 9/1987 | Mackay, Jr. . |
| 4,754,577 | 7/1988 | Mackay, Jr. ................. 451/342 |
| 4,760,670 | 8/1988 | Mackay, Jr. ................. 451/342 |
| 4,878,316 | 11/1989 | Mackay, Jr. ................. 451/342 |
| 4,924,634 | 5/1990 | Mackay, Jr. ................. 451/342 |
| 4,934,107 | 6/1990 | Mackay, Jr. ................. 451/342 |
| 4,979,336 | 12/1990 | Mackay, Jr. ................. 451/342 |
| 5,031,361 | 7/1991 | Mackay, Jr. ................. 451/342 |
| 5,072,223 | 12/1991 | Buc . |

FOREIGN PATENT DOCUMENTS 2172823  10/1986  United Kingdom ................. 451/342

Primary Examiner—Bruce M. Kisliuk
Assistant Examiner—Derris H. Banks
Attorney, Agent, or Firm—Robbins, Berliner & Carson

[57] ABSTRACT

A disposable abrasive wheel for mounting on a rotatable threaded spindle of a power tool. The abrasive wheel contains a retaining nut on one side and a backing member on the other side non-removably secured together on the abrasive wheel without the aid of adhesives in such a manner that the abrasive wheel is placed in compression when it is operably secured upon the spindle of the power tool under operative loads. A metal pressure cap extends outwardly from the backing member and has an upper flat surface for engaging a should formed on the spindle of the power tool during operation of the finishing article. The metal pressure cap includes an inner surface defining a plurality of grooves. A peripheral wall extends upwardly from the retaining nut into the pressure cap and includes portions thereof disposed within said grooves.

10 Claims, 3 Drawing Sheets

5,538,464

DISPOSABLE ABRASIVE WHEEL HAVING DISPOSABLE MOUNTING HUB INCLUDING IMPROVED METAL PRESSURE CAP AND METHOD OF MANUFACTURING THE SAME

FIELD OF THE INVENTION

This invention relates generally to abrasive articles and more particularly to abrasive wheels having a mounting hub permanently affixed thereto with the combination adapted for quick attachment and release to an appropriate portable power tool. The abrasive wheel may be disposed of when spent.

BACKGROUND OF THE INVENTION

The use of rotatably driven abrasive articles is widespread and familiar in our industrial society. One of the more serious problems encountered in the use of such devices resides in the provision of effective means for preventing undesired or accidental disassociation of the article from the shaft, spindle or other rotatable drive means on which it is mounted. This problem is particularly acute when the connection between the article and its driving shaft or spindle is intentionally detachable to facilitate quick removal and replacement of the article. Into this category fall a host of devices, for example, portable powered grinders wherein the grinding wheels employed are intentionally detachable from the power driven shaft so that they may be readily replaced. To properly mount the grinding wheel upon the shaft, provision must be made to provide sufficient clamping force and also to secure the wheel rotationally.

One means of securing the grinding wheel to the drive shaft has been to provide an appropriate backing member with a central opening which is aligned with an opening provided in the depressed center abrasive grinding wheel. A bolt or nut member (depending upon the configuration of the drive shaft; that is, whether it is externally or internally threaded) is inserted from the face side of the grinding wheel and is then tightened in place. In this manner a plurality of loose parts are configured in a completed assembly ready for use. As the grinding wheel is utilized the appropriate clamping force is provided to securely affix the grinding wheel to the drive shaft. Such an assembly, however, typically requires appropriate tools such as wrenches or the like to attach and remove the grinding wheel from the drive shaft. Such a device is shown in U.S. Pat. Nos. 489,149; 3,596,415; 1,998,919; 566,883; 507,223; 1,162,970; 791,159; 489,149 and 3,210,892.

Subsequently it became desirable to affix the mounting hub permanently to the grinding wheel so that the entire unit may be attached and detached from the drive shaft and discarded when the grinding wheel has been worn down. In these types of devices it is customary to utilize an adhesive such as an epoxy resin or the like between the backing member and the back surface of the grinding wheel to retain integrity between the mounting hub and the grinding wheel to secure the wheel rotationally.

Even though the adhesive tended to work quite well in most applications, it was discovered that in some instances the adhesive would break loose and the grinding wheel would rotate relative to the mounting hub. Such was particularly the case since the hub was a one-piece member which was internally threaded and held in place upon the grinding wheel by swaging an extension thereof into place, thus providing a fixed clamping force holding the grinding wheel. No additional clamping force was exerted during further rotation of the wheel during use as was the case with the traditional nut which was secured from the face as above described. As a result various keyways and corresponding key structures were developed between the wheel and the mounting hub and used in conjunction with the adhesive to preclude rotational movement between the mounting hub and the grinding wheel. Examples of such devices are shown in U.S. Pat. Nos. 3,136,100; 4,015,371; 2,278,301; 3,081,584; 3,500,592; 3,800,483; 4,240,230 and 4,541,205.

Additional prior art patents known to applicant are U.S. Pat. Nos. 3,041,797; 3,879,178; 1,724,742; 3,912,411; 3,879,178; 3,960,516; 4,026,074; 4,054,425; 4,088,729; 4,322,920; 4,439,953; 4,449,329; 4,601,661; 791,791; 872,932; 2,567,782; 3,136,100; 3,210,892 and 3,621,621.

The devices utilized in the prior art for providing the disposable finishing article assembly including the permanent affixed mounting hub generally provide the service intended. There are, however, certain inherent disadvantages found with regard to the various devices. Such disadvantages are that in manufacturing, the utilization of an adhesive adds additional labor to the cost of manufacturing. In certain of the devices, parts must be keyed together and properly aligned in order to function appropriately. In addition thereto, through the utilization of die-cast mounting hubs which are included as an integral unitary part of the backing member there is no additional clamping force exerted upon the finishing article as it is being rotated by the power tool. Furthermore, such mounting hubs are relatively bulky, take up space and add substantial weight and additional cost to the completed product.

To solve the problems of the prior art as briefly summarized above, applicant has developed an abrasive article having a drive member non-removably affixed thereto for mounting on a rotatable spindle of a power tool. The drive member includes a backing member and a retaining nut positioned on opposite sides of the abrasive article with the retaining nut upset or swaged to hold the retaining nut and the backing member together on opposite sides of the abrasive article. A pressure cap is provided and may take various forms and may be constructed of different materials. For example, the pressure cap may be metal or plastic and may be secured to the backing member through a rotational mechanism or through upsetting or clamping the backing member. The pressure cap engages a shoulder on the spindle of the power tool and through engagement between the treads and the retaining nut and the threaded spindle as well as the forces applied by the pressure cap. The abrasive article is placed in compression between the backing member and a flange on the retaining nut during use of the abrasive article when such is operatively secured upon the spindle of the power tool. Such devices are illustrated and described in applicant's issued patents; namely 4,694,615; 4,754,577; 4,760,670; 4,924,634; 4,979,336 and 5,031,361. These patents of applicant constitute the best prior art known to applicant. The disclosure of applicant's U.S. Pat. No. 4,694,615 is incorporated herein by reference.

SUMMARY OF THE INVENTION

An abrasive wheel having a drive member non-removably affixed thereto for mounting on a rotatable spindle of a power tool. The drive member includes a backing member having a central opening therethrough secured by a retaining nut positioned on the opposite side from the backing member. The retaining nut extends through an opening in the abrasive wheel from the face toward the back of the finishing article and has a radial flange at one end thereof seated against the abrasive wheel face. A pressure cap defining a central opening extends outwardly from the backing member. The pressure cap includes an inner surface defining a plurality of spaced apart grooves. Means extending upwardly from the end of said retaining nut opposite said flange is disposed within said grooves to secure the retaining nut, backing member and pressure cap on said wheel without the use of adhesives while permitting limited longitudinal movement therebetween. The pressure cap extends longitudinally away from the backing member for the top of the pressure cap to engage the power tool spindle for placing the abrasive wheel in compression between said backing member and radial flange during use thereof when the finishing article is operatively secured upon the spindle of the power tool.

DETAILED DESCRIPTION

Figure 1:
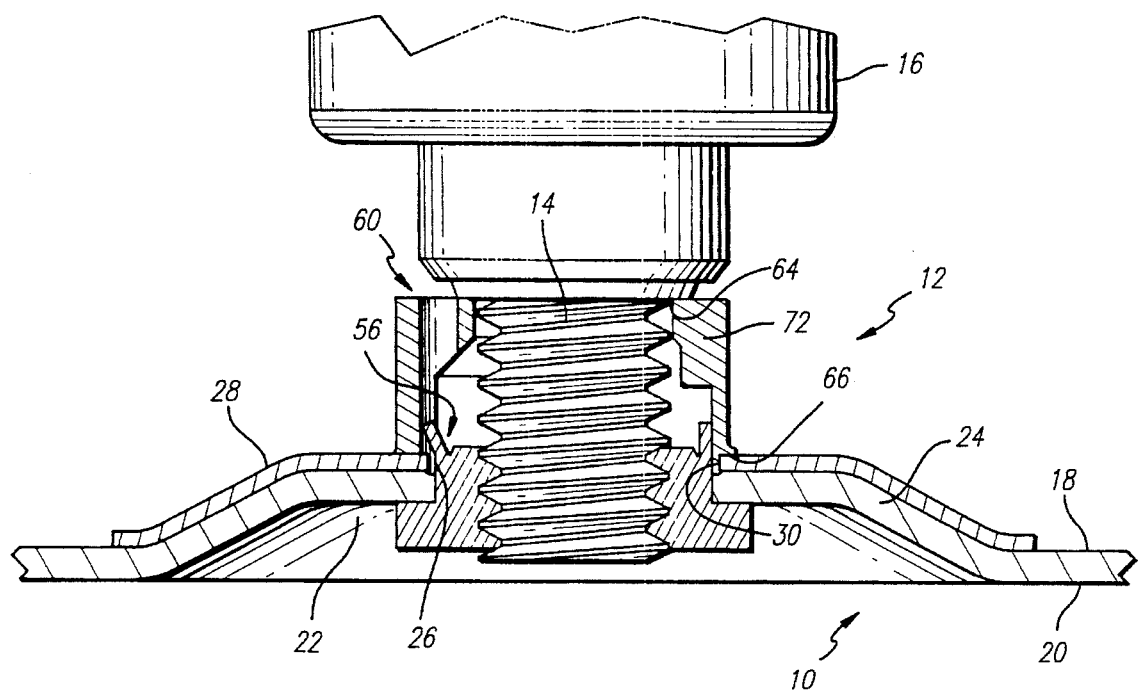
FIG. 1 is a cross sectional view of a preferred embodiment of a finishing article assembly constructed in accordance with the principles of the present invention and mounted in operable position on the spindle of a power tool.

By reference now to FIGS. 1 through 7, there is illustrated a preferred embodiment of a disposable abrasive wheel drive member assembly constructed in accordance with the principles of the present invention. The term abrasive wheel is intended herein to be a generic term for abrasive devices constructed in accordance with the present invention which may take many forms, such, for example, as grinding wheels of all types including depressed center wheels, flat disks, cut off wheels, diamond blades, or the like. For purposes of ease of illustration and clarity of description only a seven (or nine) inch diameter depressed center grinding wheel will be shown and described. It will, however, be understood by those skilled in the art that other disposable abrasive articles which may be placed in compression during use thereof may be substituted for the grinding wheel shown. As is shown in FIGS. 1 through 7, a depressed center grinding wheel 10 has a disposable drive member or hub assembly 12 permanently affixed thereto without the use of adhesives so that the grinding wheel may be attached to the threaded spindle 14 of an appropriate power tool 16. According to the principles of the present invention, a disposable mounting hub or drive member is constructed in such a manner that when the grinding wheel is placed in operation upon the spindle 14 the grinding wheel 10 is placed in compression and the more force that is applied to the grinding wheel during utilization thereof, the greater the operational compression becomes. As a result of placing the grinding wheel in such compression the grinding wheel is maintained upon the spindle and at the same time, through the compression or clamping force, the grinding wheel 10 cannot rotate relative to the drive member or hub assembly 12. However, as a result of the construction of the drive member, the spent grinding wheel may be easily removed from the spindle for disposal usually without the utilization of hand tools or the like.

As is clearly shown, the grinding wheel 10 includes a back surface 18 and a front surface 20. The central portion of the grinding wheel is depressed as viewed from the front thereof and as is shown at 22, with a corresponding central raised portion 24 on the back thereof. A centrally located aperture 26 is provided in the depressed center portion of the grinding wheel 10. The purpose of the depressed center of the grinding wheel 10 is to insure that the driving member or spindle does not protrude beyond the face portion 20 of the wheel 10 and thus interfere with a workpiece during the time the grinding wheel 10 is being utilized. However, when certain types of abrasive articles are utilized such that the outer circumference is used instead of the face, then a depressed center may not be necessary or included in the article.

A backing member 28 is provided and is adapted to be received on the back surface 18 of the grinding wheel 10 about the raised portion 24. The backing member 28 has a diameter which is less than the diameter of the wheel 10. The backing member 28 defines a second central aperture 30 therethrough which is aligned with the aperture 26 in the grinding wheel 10. The backing member 28 is preferably stamped from sheet metal.

Figure 3:
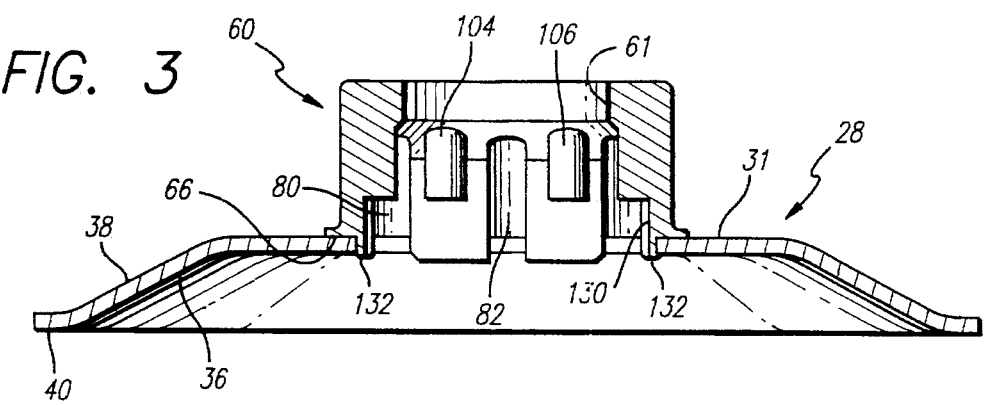
FIG. 3 is a cross sectional view taken about the lines 3—3 in FIG. 2 of a backing member constructed in accordance with the present invention and having a pressure cap affixed thereto.

As is shown more specifically in FIG. 3, the backing member 28 includes an inner surface 36 and an outer surface 38. The inner surface 36 is disposed opposed the back surface 18 of the abrasive finishing wheel 10. The inner surface 36 includes a land 40. The land 40 is formed about the outer peripheral portion of the backing member 28. On seven and nine inch wheels with depressed centers the land 40 always engages the back surface 18 of the abrasive finishing wheel away from the depressed center. On smaller depressed center grinding wheels, diamond wheels, flat surface or cut off wheels and the like, the backing member may take the form of a flat washer like member.

Figure 4:
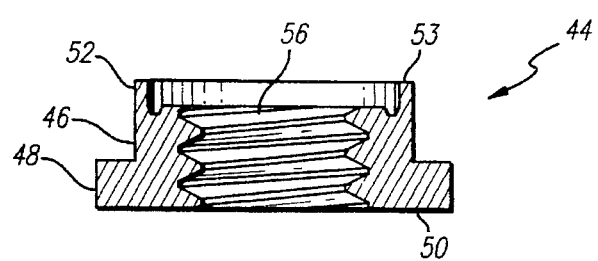
FIG. 4 is a cross sectional view of a retaining nut constructed in accordance with the principles of the present invention.
Figure 2:
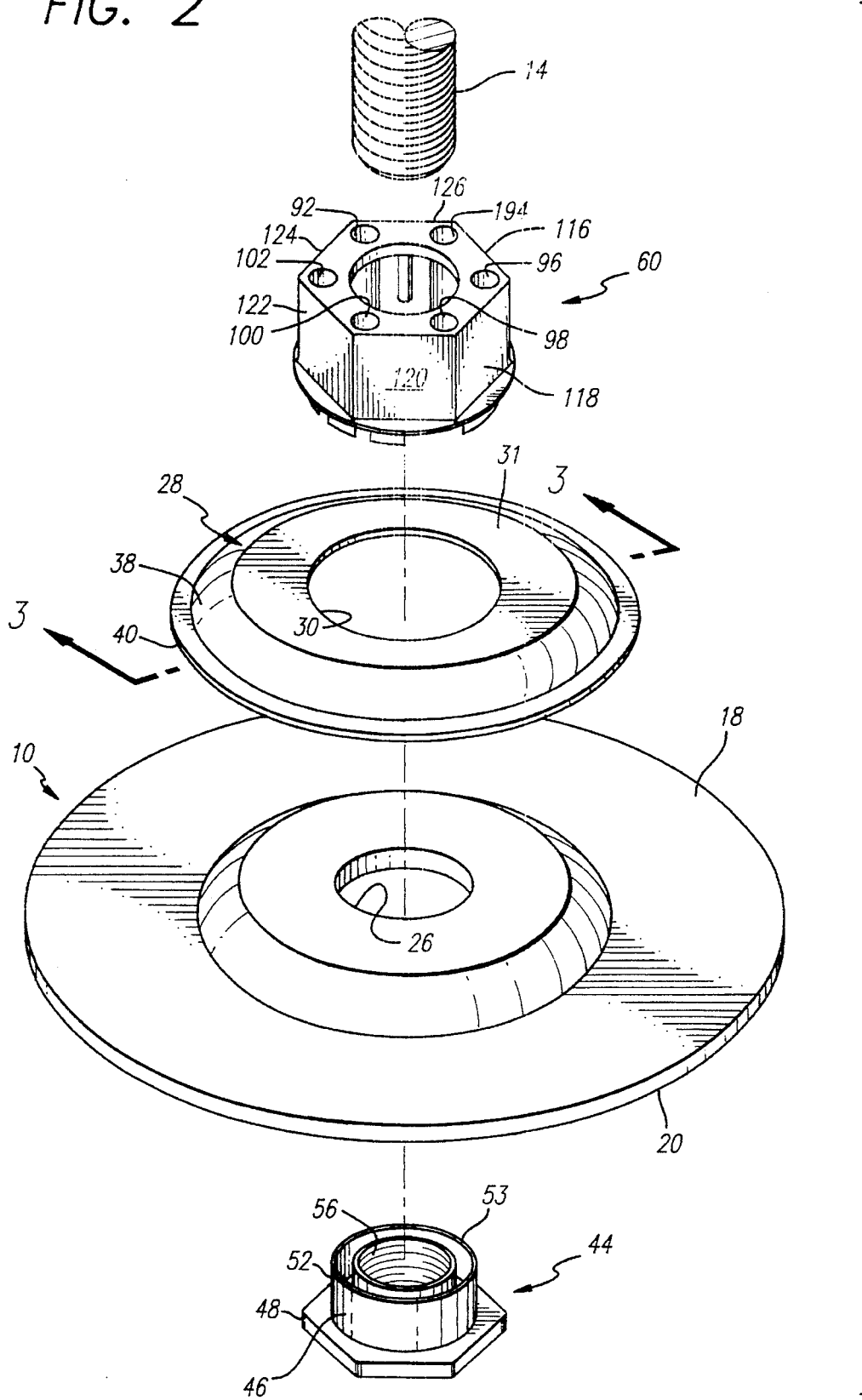
FIG. 2 is an exploded view of the structure as illustrated in FIG. 1.
Figure 5:
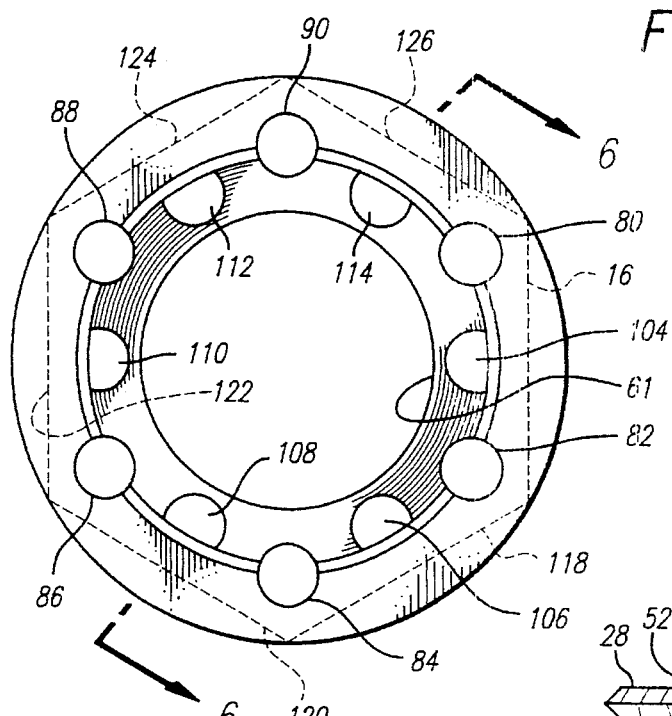
FIG. 5 is a bottom plan view of a pressure cap constructed in accordance with the principles of the present invention.

As shown in FIG. 4, a retainer nut 44 includes a body portion 46 which is hollow and has a radially outwardly extending flange 48 at a first end 50 thereof. The internal surface of the body 46 has threads 56 formed therealong for attachment to the threaded spindle 14 of the power tool. A continuous wall 52 extends upwardly from the body 46 and terminates in a rim 53. The wall 52 is relatively thin and as will be described more in detail below may be upset or swaged. The nut 44 is inserted through the aperture 26 in the grinding wheel and the aperture 30 in the backing member 28 from the front surface 20 toward the rear surface 18 of the grinding wheel 10. The wall 52 of the nut 44 extends through the opening 30 in the backing member 28.

The nut 44 is preferably constructed from a metal die casting but may be formed from an aluminum extrusion which is then machined to provide the flange 48 and the threads 46. Alternatively the nut may be formed from steel bar stock, molded plastic, composite materials, or formed by cold heading.

To provide proper operational compressive forces on the disposable grinding wheel as above described, a pressure cap 60 forms a part of the hub assembly 12. The metal pressure cap 60 is formed as a hexagonal nut shaped member having a hollow body 72, and an inner surface 73. Preferably the metal pressure cap 60 is formed by metal die casting, however, it will be recognized that it may be formed from molded plastic or composite material. The metal pressure cap 60 includes a first or rear surface 62 for engaging a surface 64 on the power tool spindle when the grinding wheel is in an operable position on the power tool 16. A second or front surface 66 on the metal pressure cap 60 rests upon the outer surface 38 of the backing member 28.

The inner surface 73 of the pressure cap 60 defines a plurality of grooves 80, 82, 84, 86, 88 and 90. The grooves 80–90 terminate at the upper surface 62 in a plurality of apertures 92–102. Also extending inwardly radially from the surface 73 is a plurality of ribs 104, 106, 108, 110, 112 and 114. The ribs 104–114 are disposed between adjacent grooves 80–90 respectively. The ribs 104–114 provide strength to the flat surfaces 116–126 forming the hexagonal nut form of the pressure cap 60.

The pressure cap 60 at the end 128 thereof includes in the embodiment as illustrated an extension 130. The extension 130 extends through the opening 30 in the backing member 28 and is turned as shown at 132 in FIG. 3 to retain the pressure cap on the backing member 28 so that it protrudes outwardly therefrom. It will be appreciated by those skilled in the art that a relatively minor amount of material is required to secure the pressure cap 60 to the backing member 28 because there is no tension force being applied which would tend to separate the pressure cap from the backing member. Those skilled in the art will also recognize that the pressure cap and the backing member may be constructed of a unitary die cast structure if such is desired or, alternatively, from a unitary molded plastic or composite member depending upon the particular application. The combination of the metal pressure cap 60 and the backing member 28 is retained in position on the abrasive wheel 10 by upsetting the continuous wall 52 so that portions thereof extend into the grooves 80–90. Once installed, the retaining nut 44, the backing member 28 and the metal pressure cap 60 remain permanently on the grinding wheel 10 and are disposed of along with the spent wheel 10. The hollow body 72 of the metal pressure cap 60 defines an aperture 61 for receiving the spindle 14 of the power tool. When assembled, the apertures 26, 30 and 61 are aligned axially.

Figure 7:
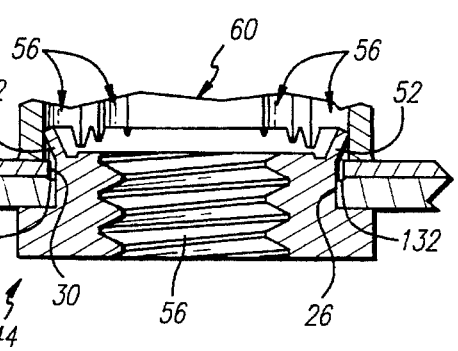
FIG. 7 is an enlarged fragmentary cross sectional view illustrating a preferred embodiment for securing the pressure cap, the backing member and the retaining nut to the abrasive wheel.
Figure 6:
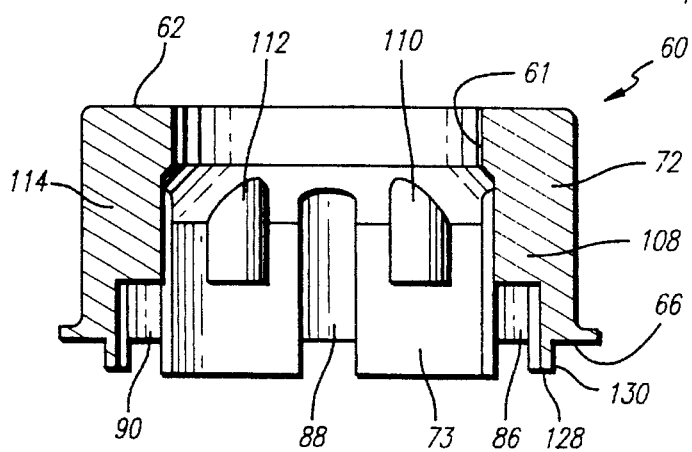
FIG. 6 is an enlarged cross sectional view of the pressure cap taken about the lines 6—6 of FIG. 5.
Figure 8:
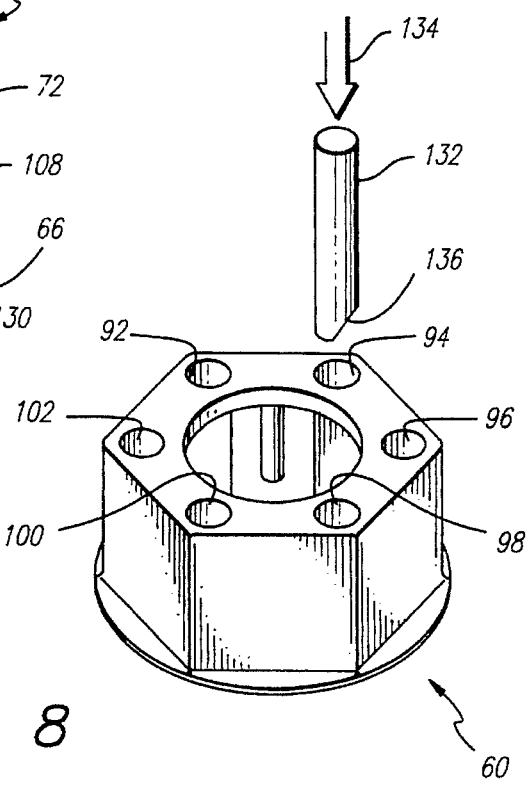
FIG. 8 illustrates the manner in which the securing operation may be performed.

As is illustrated more particularly in FIG. 8 along with FIGS. 1, 6 and 7, the hub assembly is affixed to the wheel 10 by upsetting sections of the wall 52 extending upwardly from the nut 44 so that these sections of the wall 52 are disposed within and extend into the grooves 80–90 formed in the inner surface 73 of the pressure cap 60. During assembly the retainer nut 44 is inserted through the opening 26 in the wheel 10 with the wall 52 extending upwardly from the rear surface 18 thereof. The combination of the backing member 28 with the pressure cap 60 affixed thereto is then disposed such that the wall 52 is received within the hollow body 72 of the pressure cap 60. An appropriate tool such as is illustrated at 132 in FIG. 8 is inserted into the apertures 92–102 of the body 72 of the pressure cap 60. An appropriate force F is applied downwardly thereto as shown by the arrow 134. The end 136 of the tool is appropriately shaped to engage the rim 53 of the wall 52 and upset the wall 52 thereof driving sections of the wall 52 into the grooves 80–90. When such is done the retaining nut and the combination of the metal pressure cap and the backing member are held in place on the wheel 10. By causing the sections of the wall 52 to engage the grooves 80–90 of the pressure cap 60 it will be recognized by those skilled in the art that the pressure cap and the nut are rotationally locked together. Also by extending the sections of the wall into the grooves there is an axial securing together of these elements on the wheel 10. The assembly is also accomplished such that there is permitted limited axial movement so that when the wheel is operably affixed to the spindle 14 the wheel is placed in compression through forces applied by the pressure cap 60 downwardly and by the flange 50 on the nut 44 upwardly through the forces generated by the cooperative threads between the spindle and the retaining nut 44.

Although a groove has been provided at the point where the flat surfaces of the outer surface of the pressure cap 60 come together so that in the hexagonal form there are six such grooves it should be understood by those skilled in the art that a smaller number of grooves may be utilized, for example, such as two disposed opposed each other. However, by providing the additional two opposed sets of such grooves additional strength for the rotational locking is provided.

It will be understood by those skilled in the art that by providing the hexagonal form with the rotational locking as above described one may, if desired, utilize a wrench to remove the spent abrasive wheel from the power tool 16 when it is required to replace it with a fresh wheel. Experience, has however, taught that because of the particular way in which the present invention is constructed it may be easily removed from the power tool by hand.

The force necessary to cause the grinding wheel 10 to be placed in compression is generated upon attachment of the spindle 14 to the threads 56 in the nut 44. By reference to FIG. 1 it will be noted that when the grinding wheel is threaded upon the spindle 14 the surface 62 engages the spindle 64. The interengagement between the threads 14 and 56 of the spindle and nut, respectively, urge the nut upward toward the backing member 28 as the wheel is seated upon the spindle. At the same time, the spindle seat 64 applies a downward force to surface 62 of the pressure cap 60 which in turn, through the surface 66 applies a downward force to the backing member 28. Therefore, this mutual clamping force causes the grinding wheel to be placed in compression. Those skilled in the art will recognize that as the grinding wheel 10 is used by being placed against a workpiece, additional torque is applied causing the grinding wheel to be further tightened onto the spindle 14. That is, if the grinding wheel moves, even incrementally, during contact with a workpiece, the friction between the nut and the grinding wheel center causes the nut to rotate in a further tightening direction. Such rotation of the nut further urges the nut toward the flange which in turn applies a further force to the flange. The more the grinding wheel is tightened the greater the operational compression force becomes and the more securely the grinding wheel 10 is clamped between the backing member 28 and the flange 48 on the nut 44. As a result of this strong clamping or compression the grinding wheel 10 is precluded from movement relative to the hub or driving member 12 and at the same time is precluded from disengaging from the spindle 14. It will be recognized by those skilled in the art that the grinding wheel assemblies as illustrated in FIGS. 1 through 7 and as above described require no adhesive for construction and may be simply and easily assembled, are relatively light in weight as compared to the prior art devices utilizing the solid cast hubs and provides a secure attachment of the abrasive article to the power tool and through the utilization of the increased compression precludes relative rotation of the grinding wheel with respect to the driving member. It has also been discovered that the utilization of the device as above described and as constructed in the preferred embodiment is extremely smooth in operation with no vibration. The reason for such extremely smooth operation is that all of the parts are perfectly aligned one with the other with the abutting surfaces parallel when in compression and only the wheel 10 can cause any vibration and then only if it is not properly balanced during the construction thereof.

Through the structures as illustrated and described, all currently known sizes of depressed center grinding wheels may be accommodated. In addition thereto flat grinding wheels and diamond wheels may also be accommodated.

There has thus been disclosed a disposable abrasive article driving member assembly which securely holds the article during operation, which is light in weight, vibration-free, and less expensive than prior art throw-away articles while meeting all safety standards currently known and in existence.

What is claimed is:

1. In an abrasive article having a face, a back and a first centrally disposed aperture therethrough with a disposable drive member non-removably affixed thereto for mounting on a threaded rotatable spindle of a power tool, the drive member including a backing member having an inner and outer surface and a diameter smaller than the diameter of said abrasive article and a second centrally disposed aperture therethrough aligned with said first aperture, and a retainer nut having a hollow internally threaded body having first and second ends and a first radially outwardly extending flange extending from said first end of said body, said body extending through said first and second apertures from said face toward said back with said radial flange seated against said face, the improvement comprising:

a pressure cap extending outwardly from said backing member outer surface and having inner and outer surfaces and defining a third centrally (disposed aperture therethrough aligned with said first and second apertures, said pressure cap inner surface defining a plurality of spaced apart grooves with portions of said cap inner surface disposed there between; and means including a wall extending upwardly from said second end of said body, portions of said wall being upset and extending into said spaced apart grooves to non-removably axially secure said retaining nut and said backing member together on said article without the use of adhesives, said backing member and said retaining nut moving toward each other to compress said finishing article therebetween as operative loads are applied to said finishing article during use on said power tool.

2. The improvement as defined in claim 1 wherein said wall is continuous and includes a rim.

3. The improvement as defined in claim 2 which further includes a plurality of ribs extending radially inwardly from said pressure cap inner surface.

4. The improvement as defined in claim 2 wherein said portion of said wall extending into each of said grooves is a different portion of said wall including said rim.

5. The improvement as defined in claim 1 wherein said pressure cap outer surface is in the form of a hexagonal nut having flat surfaces.

6. The improvement as defined in claim 5 wherein each of said apertures is disposed adjacent a common terminus of adjacent flat surfaces.

7. The method of manufacturing a disposable abrasive article having a drive member non-removably affixed within a centrally disposed aperture thereof including the steps of:

providing a backing member having a pressure cap extending outwardly therefrom upon one side of said abrasive article, said pressure cap including a plurality of grooves on an inner surface thereof;

providing a retaining nut having a hollow internally threaded body and a radially-outwardly extending flange at one end of said body and a wall extending upwardly from the opposite end of said body;

inserting said retainer nut through said centrally disposed aperture so that said wall extends into said pressure cap adjacent said grooves;

placing a tool into engagement with said wall; and applying a force to cause said tool to upset at least a portion of said wall to drive said portion of said wall into that groove adjacent said portion of said wall.

8. The method as defined in claim 7 wherein said pressure cap further includes a plurality of apertures aligned with said grooves and inserting said tool through said apertures.

9. The method as defined in claim 8 wherein said tool is inserted through a plurality of apertures simultaneously.

10. In an abrasive article having a face, a back and a first centrally disposed aperture therethrough with a disposable drive member non-removably affixed thereto for mounting on a threaded rotatable spindle of a power tool, the drive member including a backing member having an inner and outer surface and a diameter smaller than the diameter of said abrasive article and a second centrally disposed aperture therethrough aligned with said first aperture, and a retainer nut having a hollow internally threaded body having first and second ends and a first radially outwardly extending flange extending from said first end of said body, said body extending through said first and second apertures from said face toward said back with said radial flange seated against said face, the improvement comprising:

a pressure cap extending outwardly from said backing member outer surface and having inner and outer surfaces and defining a third centrally disposed aperture therethrough aligned with said first and second apertures, said pressure cap inner surface defining a plurality of spaced apart grooves, said pressure cap having an upper flat surface for engaging said spindle wherein said upper flat surface defines a plurality of apertures, each of said grooves being aligned with one of said apertures; and means including a continuous wall having a rim extending upwardly from said second end of said body, a different part of said wall including said rim extending into each of said spaced apart grooves to non-removably secure said retaining nut and said backing member together on said article without the use of adhesives, said backing member and said retaining nut moving toward each other to compress said finishing article therebetween as operative loads are applied to said finishing article during use on said power tool.

* * * * *